(12) United States Patent
Lee

(10) Patent No.: US 6,353,481 B1
(45) Date of Patent: Mar. 5, 2002

(54) TECHNIQUE FOR CORRECTING PRINTING ERRORS IN A SHUTTLE TYPE MULTIFUNCTIONAL APPARATUS

(75) Inventor: Yoon-Tae Lee, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/186,364

(22) Filed: Nov. 5, 1998

(30) Foreign Application Priority Data

Nov. 6, 1997 (KR) .......................................... 1997-58305

(51) Int. Cl.$^7$ ............................................... G06F 15/00
(52) U.S. Cl. ............................. 358/1.14; 347/5; 347/19; 347/40; 400/124.01; 400/124.11
(58) Field of Search ........................ 358/1.1, 1.5, 1.11, 358/1.12, 1.13, 1.14, 1.15, 1.16; 347/19, 5, 13, 14, 20, 40, 41; 400/10, 42, 44, 46, 74, 124.01, 124.11

(56) References Cited

U.S. PATENT DOCUMENTS

| | | | | |
|---|---|---|---|---|
| 5,297,017 A | * | 3/1994 | Haselby et al. | 347/131 |
| 5,480,240 A | * | 1/1996 | Bolash et al. | 400/124.01 |
| 5,524,140 A | | 6/1996 | Klausner et al. | |
| 5,661,788 A | | 8/1997 | Chin | |

* cited by examiner

Primary Examiner—Mark Wallerson
(74) Attorney, Agent, or Firm—Robert E. Bushnell, Esq.

(57) ABSTRACT

In a technique for correcting printing errors in a shuttle type multifunctional apparatus, a preset reference pattern is printed and the printed reference pattern is scanned. Then, the number of dots are detected as errors between the original reference pattern and the scanned reference pattern. After calculating a correcting value by adding and subtracting the numbers of dots corresponding to the errors to and from numbers of printing nozzles according to a resolution of the multifunctional apparatus, the multifunctional apparatus controls a moving distance of an electric line feeding motor. Accordingly, a simple operation enables the printing errors to be corrected, thereby improving the efficiency of operations in the multifunctional apparatus.

25 Claims, 6 Drawing Sheets

Number of dots corresponding to printing errors (X)

Number of dots corresponding to printing errors (Y)

TECHNIQUE FOR CORRECTING PRINTING ERRORS IN A SHUTTLE TYPE MULTIFUNCTIONAL APPARATUS

CLAIM OF PRIORITY

This application makes reference to, incorporates the same herein, and claims all benefits accruing under 35 U.S.C. §119 from an application for A METHOD FOR CORRECTING PRINTING ERRORS IN A SHUTTLE TYPE OF A MULTIFUNCTIONAL APPARATUS earlier filed in the Korean Industrial Property Office on the 6$^{th}$ of November 1997 and there duly assigned Serial No. 58305/1997.

BACKGROUND OF THE INVENTION

1. Field of the Invention

The present invention relates to a technique for correcting printing errors in a shuttle type multifunctional apparatus, and more particularly to a technique for correcting printing errors in a shuttle type multifunctional apparatus, in which it is possible to correct printing errors, such as overlaps and spacing errors, which are generated between bands of a printer block.

2. Description of the Related Art

Generally, office automation apparatus, such as a printer, a copier, a computer, a facsimile device, and a scanner, are independently utilized. Recently, with the development and a popularization of office automation apparatus, a multifunctional office automation apparatus has been proposed, which is capable of carrying out various functions. A multifunctional apparatus is defined as follows:

First, it means an apparatus, including a printer, a facsimile device, and a copier, for example, which are integrated with one another so as to perform two or more functions. Second, it means an apparatus, including a printer, a facsimile device, and a copier, for example, which cooperates with a computer so as to perform new and various functions.

In a shuttle type of multifunctional apparatus according to the related art, a scanner and a printer head are mounted on a horizontal shaft and reciprocated by means of a carriage return motor. A document to be scanned or a paper to be printed is moved at a constant velocity by means of a line feeding motor.

In a case of performing printing using the multifunctional apparatus according to the related art, bands of printing blocks are spaced from each other or overlapped with each other due to the mechanical tolerances of the multifunctional apparatus, especially the mechanical tolerance of the line feeding motor.

In order to removing printing errors such as spacing errors or overlapping of the bands of the printing blocks, therefore, the multifunctional apparatus is repeatedly subjected to a test for measuring the printing errors. Specific data are obtained by the test, and then a corrected value is calculated by adding or subtracting to/from a moving distance of a paper corresponding to a rotational velocity of the line feeding motor with reference to the specific data.

Furthermore, each corrected value is calculated to be in correspondence with each specific data with respect to a plurality of multifunctional apparatus. Then, a corrected average value is calculated and supplied to the multifunctional apparatus.

I have noticed that according to the method for correcting the printing errors in the multifunctional apparatus of the related art, however, since the corrected value must be calculated by using the specific data, the multifunctional apparatus is repeatedly subjected to the test for measuring the specific data. This is, in my opinion, a disadvantage in that the efficiency of operations is degraded.

Furthermore, since the plurality of the multifunctional apparatus are subjected to the test for measuring the printing errors and the specific data are detected from the multifunctional apparatus, the multifunctional apparatus have a different specific error even though the corrected optimum value is obtained by calculating the corrected value corresponding to the specific data and supplied to the multifunctional apparatus. Accordingly, I have found that an optimum quality of the printing cannot be obtained.

The following patents each discloses features in common with the present invention: U.S. Pat. No. 5,661,788 to Chin, entitled Method And System For Selectively Alerting User And Answering Preferred Telephone Calls, and U.S. Pat. No. 5,524,140 to Klausner et al., entitled Telephone Answering Device Linking Displayed Data With Recorded Audio Message.

SUMMARY OF THE INVENTION

The present invention has been made to overcome the above described problem of the related art.

It is an object of the present invention to provide on improved technique and apparatus for correcting printing errors.

It is another object to provide a technique and apparatus for correcting printing errors in a multifunctional apparatus, in which a preset reference pattern is printed, the printing errors are detected by scanning the printed reference pattern, and finally the printed errors are corrected, by means of a program applicable to all kinds of multifunctional apparatus.

To accomplish these and other objects of the present invention, there is provided a method and apparatus for correcting printing errors in a shuttle type multifunctional apparatus which includes a scanner module reciprocated along a horizontal axis and an electric line feeding motor capable of moving a shuttle type printer head and documents a predetermined distance, byprinting a preset reference pattern when a correcting mode for correcting printing errors is set; detecting numbers of dots corresponding to the printing errors by comparing a scanned pattern with the reference pattern after scanning the printed reference pattern; calculating a printing error value by using the number of dots corresponding to the printing errors detected in the detecting step and obtaining a correcting value by adding and subtracting the error value to and from a space between adjacent bands; storing the correcting value obtained in the calculating step; and controlling the space between adjacent bands according to the correcting value. In the calculating step, the calculation is performed by adding and subtracting the value of the errors to and from a distance at which the electric line feeding motor moves. In the controlling step, the moving distance of the electric line feeding motor is controlled according to the correcting value. The reference pattern may include first and second patterns having a predetermined length in a vertical direction, which are set to be eccentric to each other.

In the detecting step, the number of detected dots which are in correspondence with a distance between a lower end of the first pattern and an upper end of the second pattern of the scanned pattern. The distance is calculated by using a first group of dots having black data detected due to the second pattern until the lower end of the first pattern is scanned and a second group of dots having white data detected until scanning the lower end of the first pattern to the upper end of the second pattern. In the calculating step, when the first group of dots are detected, the correcting value is calculated by using a formula as follows:

(numbers of nozzles per a printing block/a resolution of a printer head)+(number of dots in printing errors/a resolution of a shuttle type scanning head)inch.
In the calculating step, when the second group of dots are detected, the correcting value is calculated by using a formula as follows:
(numbers of nozzles per a printing block/a resolution of a printer head)−(number of dots in printing errors/a resolution of a shuttle type scanning head)inch.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

Hereinafter, a method for correcting printing errors in a multifunctional apparatus according to an embodiment of the present invention will be described in detail with reference to the accompanying drawings.

Figure 1:
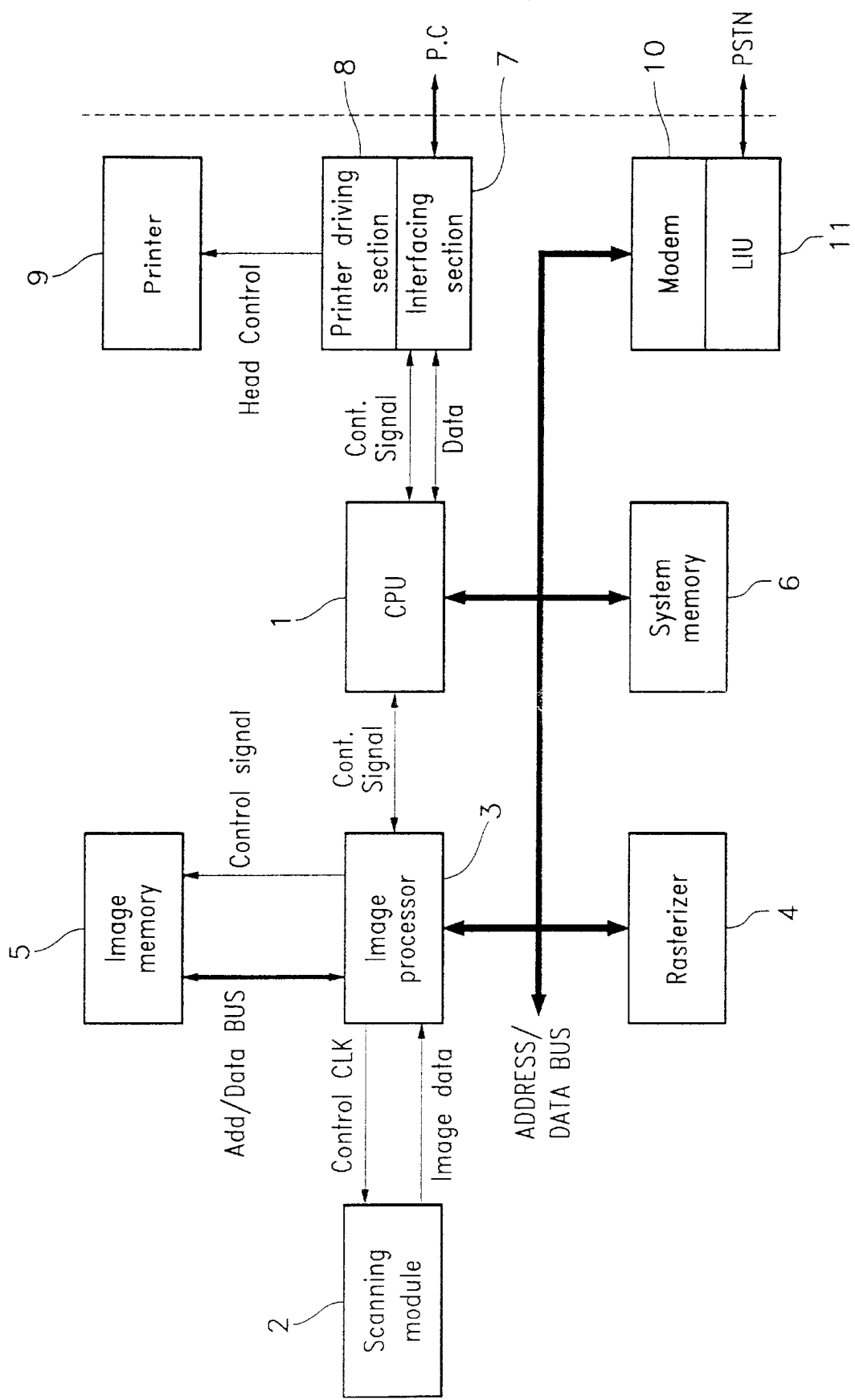
FIG. 1 is a schematic block diagram showing a structure of a shuttle type multifunctional apparatus to which a method for correcting printing errors according to the present invention is applied.

FIG. 1 is a schematic block diagram showing a structure of a shuttle type multifunctional apparatus to which a method for correcting printing errors according to the present invention is applied. In the shuttle type of the multifunctional apparatus as shown in FIG. 1, a CPU 1 controls the entire multifunctional apparatus according to a desired program which is preset in the multifunctional apparatus.

A shuttle type scanning module 2 is spaced at a predetermined distance apart from a document and reciprocated in a shuttle manner while reading images which are recorded on the document. An image processor 3 performs a shading and a gamma correction of image data which are read by the scanning module 2. The image processor 3 performs image processing operations such as resolution conversion, edge emphasis, and prevention of error diffusion. A rasterizer 4 performs a rasterizing of the image data read in a vertical block. An image memory 5 is a buffer fi* memory which is utilized for processing the image data, which is needed for performing the image processing operation in the image processor 3. A system memory 6 includes an erasable and programmable ROM containing a program for driving the entire system and a static RAM for storing system data. An interfacing section 7 is a module for interfacing the multifunctional apparatus with a computer in parallel under the 1284 protocol of the Institute of Electrical and Electronic Engineers, which transfers the scanned image data from the multifunctional apparatus to the computer or receives the image data to be printed from the computer. A printer driving section 8 generates and outputs a print head fire signal and an enable control signal needed for performing a printing operation according to a control of the CPU 1 and a signal for controlling a phase and a position of a carriage return motor. Furthermore, the printer driving section 8 controls a handling of the image data to be printed and an electric line feeding motor. A modem 10 and a line interface unit (LIU) 11 are elements of a facsimile device for transferring and receiving data.

Figure 2:
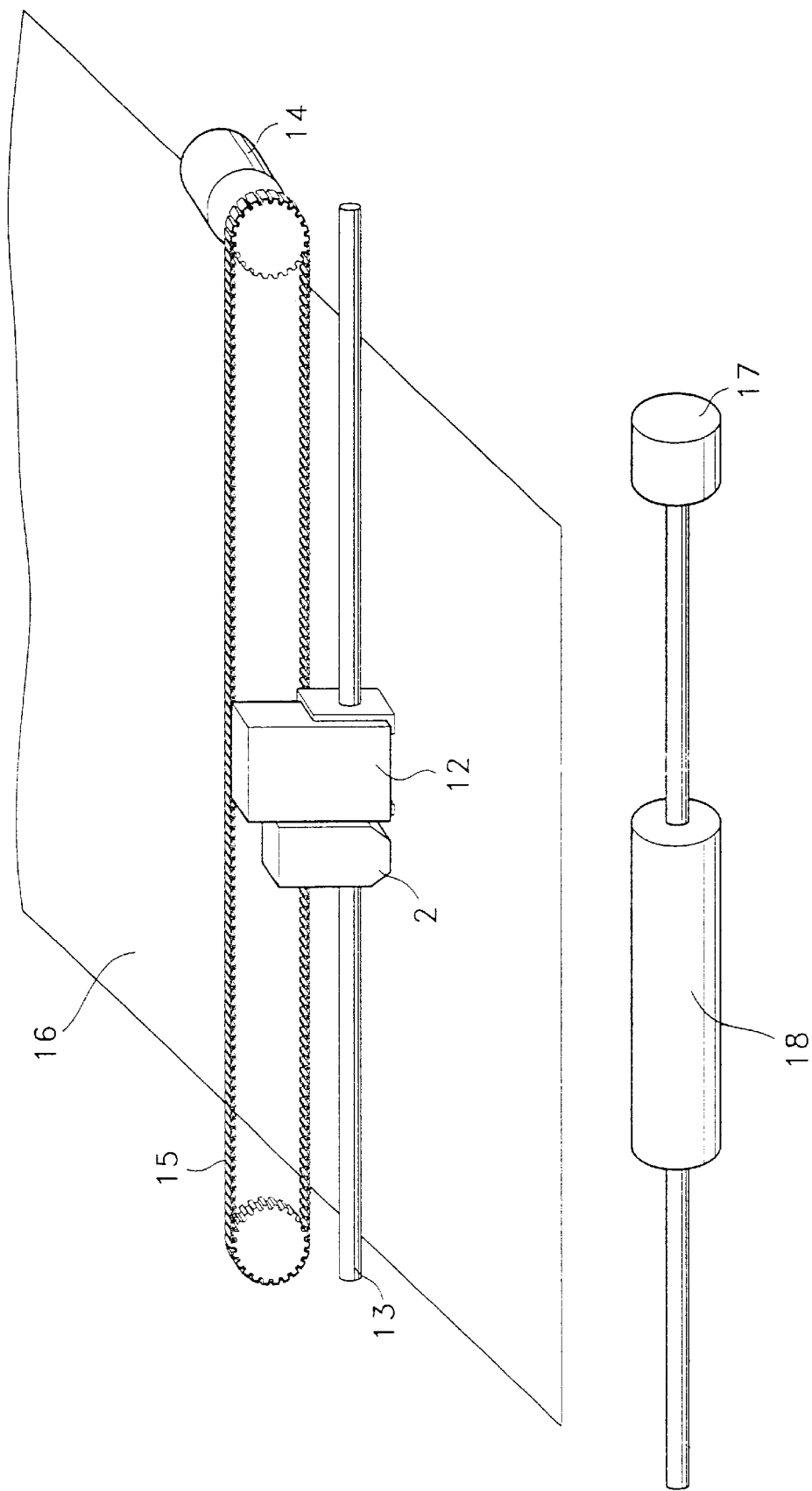
FIG. 2 is a schematic view of an interior of the multifunctional apparatus to which the method for correcting the printing errors according to the present invention is applied.

FIG. 2 is a schematic view of an interior of the multifunctional apparatus to which the method for correcting the printing errors according to the present invention is applied. In the shuttle type multifunctional apparatus as shown in FIG. 2, the scanning module 2 and printer heads 12 are mounted on a horizontal shaft 13 and reciprocated horizontally along the shaft 13 by a driving force which is transmitted from the carriage return motor 14 through a conveying belt 15, while reading the image data recorded on the document 16 or recording new image data on a paper.

The document 16 is carried in a direction at a predetermined distance by a feeding roller 18 which is driven by the line feeding motor 17. Hereinafter, the operation of the multifunctional apparatus capable of performing the method for correcting printing errors according to the present invention will be described in detail with reference to FIGS. 3A to 5.

Figure 3A:
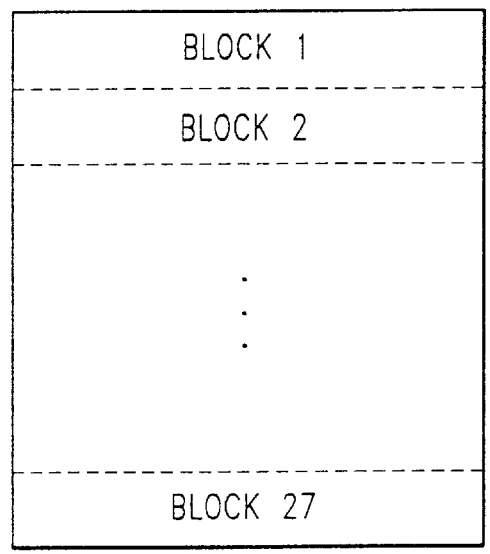
FIG. 3A shows a scanning area per a block when a A4 size paper is scanned by means of a shuttle type scanning module having a 128 dpi resolution.
Figure 3B:
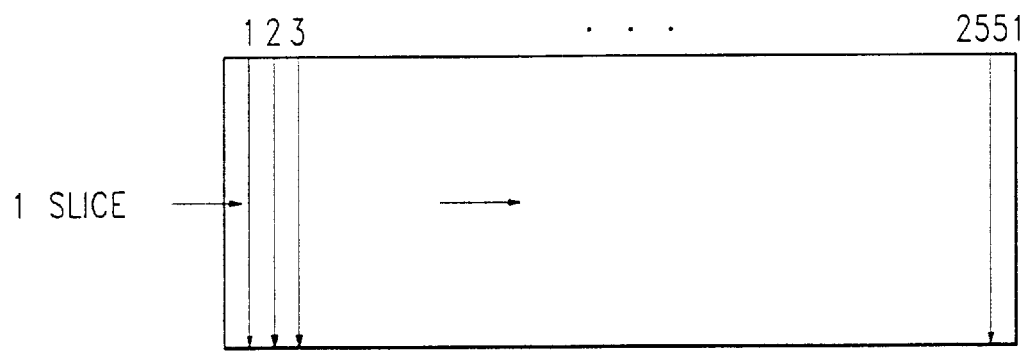
FIG. 3B shows a block on the paper scanned by means of the shuttle type scanning module having the 128 dpi resolution.
Figure 4A:
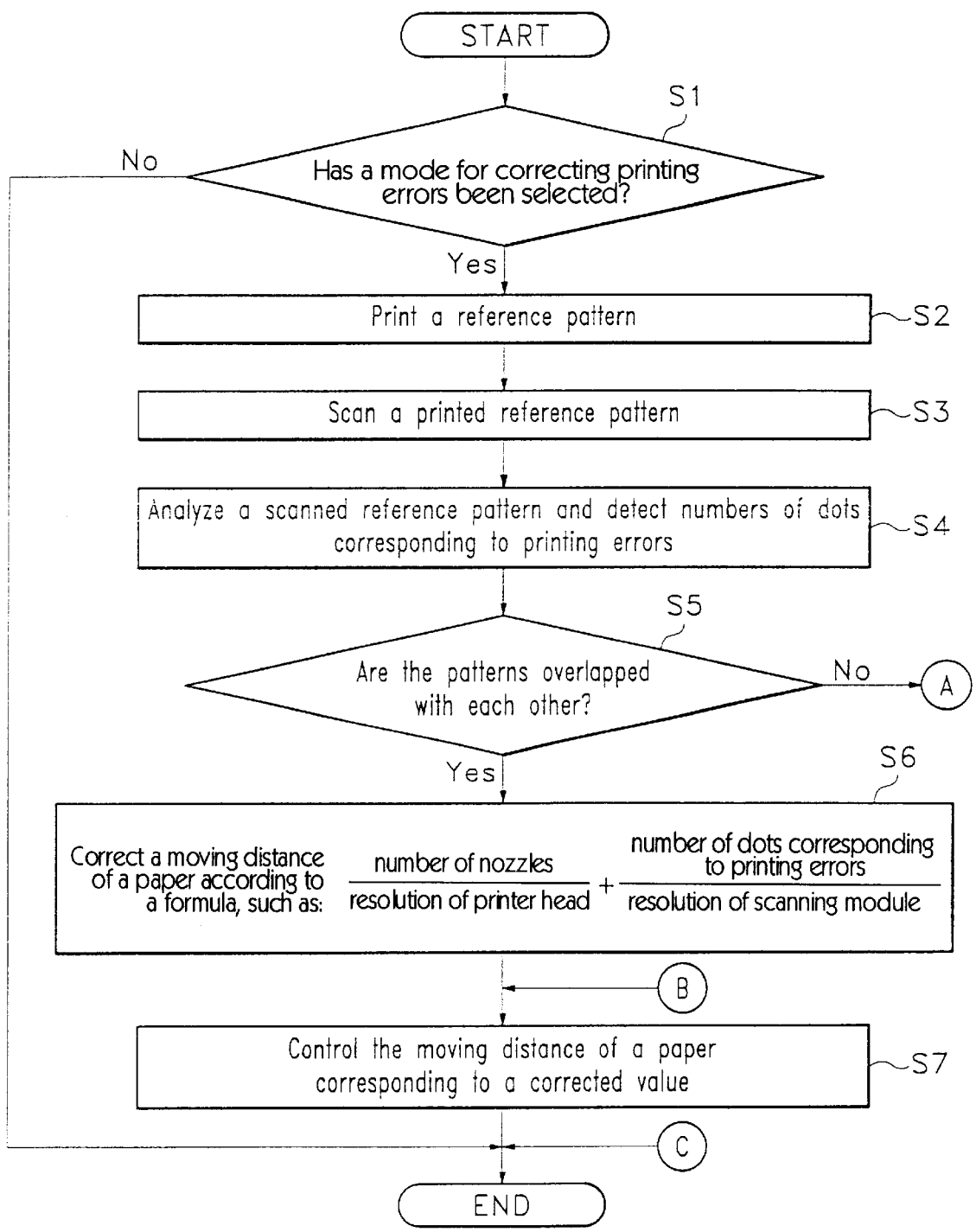
FIGS. 4A–4B together form a flowchart showing a process of performing a correction of the printing errors in the multifunctional apparatus according to the method of the present invention.
Figure 4B:
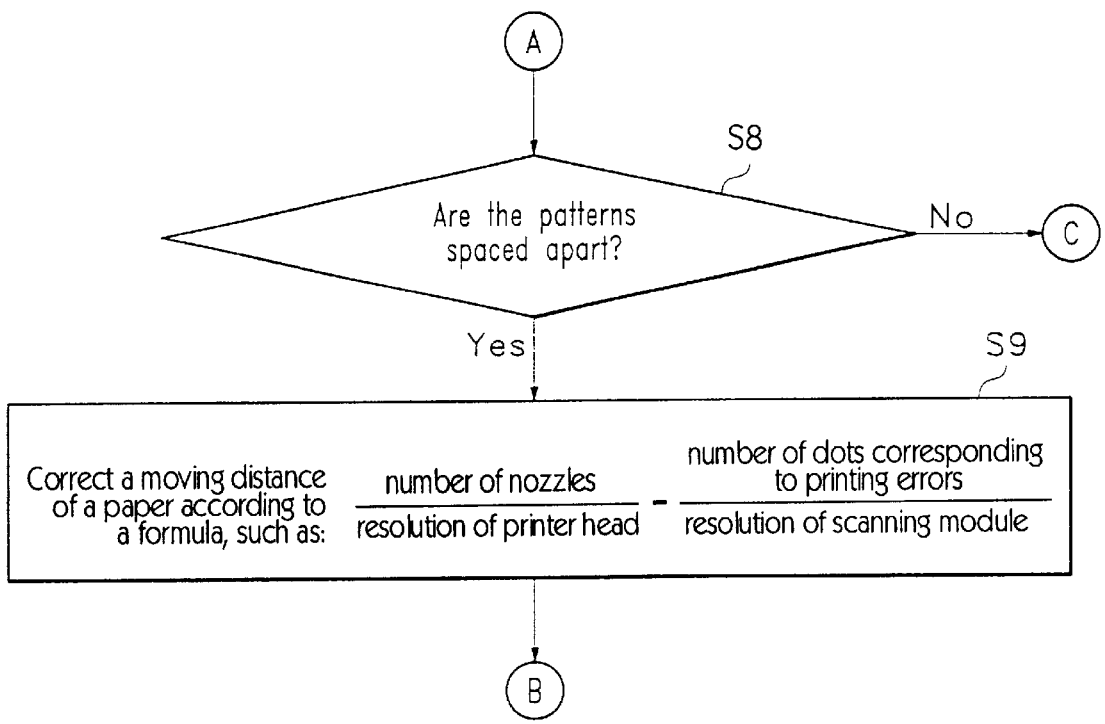

A charge coupled device (hereinafter, referred to as a CCD) is used in the shuttle type scanning module 2, which has 128 dots of vertical size. In a case of scanning a paper 16 having an A4 size, therefore, the paper 16 is divided into twenty seven scanning blocks and read block by block by the scanning module 2, as shown in FIG. 3A. In the case of that the scanning module 2 reads one of the scanning blocks on the paper 16, as shown in FIG. 3B, the scanning module 2 reads the data on the block in the vertical direction and moves in the horizontal direction by means of the carriage return motor 14 and the conveying belt 15. Then, when the reading of the block on the paper 16 is completed, the paper 16 is carried by the line feeding motor 17 and the feeding roller 18 to a position that the scanning module 2 reads a next scanning block on the paper 16.

On the other hand, the printer head 12 is constructed such that all of the nozzles print a block of data in the case of having a resolution of 600 dpi. When the printer head 12 performs printing of data on the paper 16 having an A4 size, therefore, the printer head 12 divides the paper 16 into thirty four blocks and prints the data on the paper block by block.

Figure 5A:
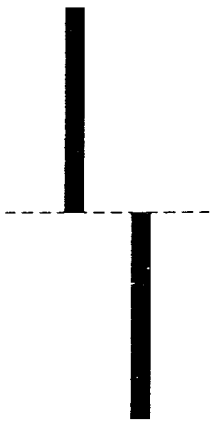
FIG. 5A shows a reference pattern.
Figure 5B:
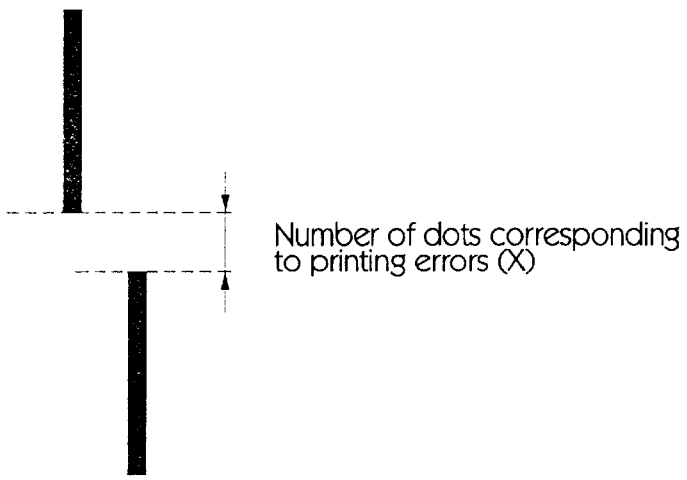
FIG. 5B shows a printed pattern of which a first pattern and a second pattern are eccentric to each other and spaced at certain distance from each other.

As describing a process of correcting the printing errors in the multifunctional apparatus as constructed above, the CPU 1 determines whether or not a user has selected a correcting mode for correcting printing errors, in step S1. When the CPU 1 determines that the user has selected the correcting mode for correcting printing errors, the CPU 1 detects and transfers a preset reference pattern from the system memory 6 to the printer 9 so that the reference pattern is printed, in step S2. As shown in FIG. 5A, the reference pattern includes a first and second patterns which have respective line shapes. The reason for setting a pair of lines in an eccentric state is to detect whether printing blocks are simultaneously overlapped with and spaced from each other. In a case of that the printer head 12 or the line feeding motor 17 has a mechanical tolerance, the first and second patterns of the printed reference pattern are spaced from each other as shown in FIG. 5B or overlapped with each other as shown in FIG. 5C.

In step S3, the CPU 1 controls the scanning module 2 so as to scan the printed reference pattern. Then, the scanned reference pattern is analyzed to detect the numbers of dots corresponding to the printing errors of the scanned reference pattern in step S4. In the case of that the first and second patterns of the printed reference pattern are spaced from each other as shown in FIG. 5B, for example, when the printed reference pattern is scanned, the CPU 1 can detect white data corresponding to predetermined numbers of vertical dots in the scanned reference pattern. The numbers of the dots corresponding to the white data indicate a distance at which a lower end of the first pattern is spaced from an upper end of the second pattern.

Figure 5C:
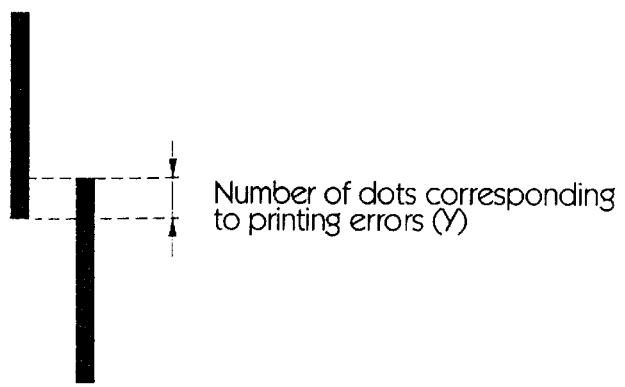
FIG. 5C shows a printed pattern of which a first pattern and a second pattern are eccentric to each other and overlap in part with each other.

In the case of that the first and second patterns are overlapped with each other as shown in FIG. 5C, meanwhile, when the printed reference pattern is scanned, the CPU 1 can detect black data corresponding to predetermined numbers of vertical dots in the scanned reference pattern. The numbers of dots corresponding to the black data indicate a distance at which the first pattern is overlapped with the second pattern.

The CPU 1 checks whether or not the detected data are black data, based on the scanned reference pattern and determines whether or not the first pattern is overlapped with the second pattern in step S5. When the black data is detected and it is determined that the first pattern is overlapped with the second pattern in step S5, the CPU 1 corrects a rotational velocity of the line feeding motor 17 by using a formula 1 as follows and then stores a corrected value in the system memory 6 in the step S6.

Formula 1

(number of nozzles per a printing block/a resolution of a printer head)+(number of dots in printing errors/a resolution of a shuttle type scanning head)inch In step S7, the CPU 1 controls the rotational velocity of the line feeding motor 17 so as to be in correspondence with the corrected value. Meanwhile, when it has been determined that the first pattern is not overlapped with the second pattern in step S5, the CPU 1 checks whether the detected data is white data and determines whether the first pattern is spaced from the second pattern, in step S8. When it has been determined that white data is detected and the first pattern is spaced from the second pattern in step S8, the CPU 1. corrects the rotational velocity of the line feeding motor 17 by using a formula 2 as follows and then stores the corrected value in the system memory 6 in step S9.

Formula 2

(number of nozzles per a printing block/a resolution of a printer head)−(number of dots in printing errors/a resolution of a shuttle type scanning head)inch The CPU 1 proceeds to step S7 and controls the rotational velocity of the line feeding motor 17 so as to be in correspondence with the corrected value.

EXAMPLE 1

In the case when the printed reference pattern, which is printed by means of the printer head 12 having a resolution of 600 dpi, is scanned by means of the scanning module 2 having a resolution of 300 dpi, the first and second patterns of the scanned reference pattern are overlapped by the dots Y with each other, the corrected value relating the moving distance of the paper 16 is calculated by using a formula 3 as follows.

Formula 3

(number of nozzles per a printing block/a resolution of a printer head)+(number of dots in printing errors/a resolution of a shuttle type scanning head)inch =208/600+ Y/300=(208+2Y)/600 inch

EXAMPLE 2

On the other hand, in the case when the printed reference pattern, which is printed by means of the printer head 12 having a resolution of 600 dpi, is scanned by means of a scanning module 2 having a resolution of 300 dpi, the first and second patterns of the scanned reference pattern are spaced by the dots X from each other, the corrected value of the moving distance of the paper 16 is calculated by using a formula 4.

Formula 4

(number of nozzles per a printing block/a resolution of a printer head)−(number of dots in printing errors/a resolution of a shuttle type scanning head)inch=208/600− X/300=(208−2X)/600 inch Consequently, the printing errors can be corrected by storing the corrected value relating the moving distance of the paper 16 and controlling the rotational velocity of the line feeding motor by my using the corrected value during the printing. According to the method for correcting the printing errors of the present invention, since the preset reference pattern is printed and the number of printing errors are detected from the printed reference pattern so that the rotational velocity of the line feeding motor is controlled to increase or decrease the moving distance of the paper, the correction of the printing errors can be easy achieved, resulting in an improving efficiency of the operation in the multifunctional apparatus. Furthermore, since the corrected value relating the printing errors can be set and stored to be adjustable with respect to the multifunctional apparatus, the high quality of the printing can be accomplished in the multifunctional apparatus.

While the present invention has been particularly shown and described with reference to a particular embodiment thereof, it will be understood by those skilled in the art that various changes in form and detail may be effected therein without departing from the scope of the invention as defined by the appended claims.

What is claimed is:

1. A method for correcting printing errors in a shuttle type multifunctional apparatus which includes a scanning module reciprocated along a horizontal shaft and a line feeding motor capable of moving documents by a predetermined distance, comprising the steps of:

printing, a preset reference pattern upon a correcting mode for correcting printing errors having been set;

detecting a number of dots corresponding to the printing errors by comparing a scanned pattern with the reference pattern after scanning the printed reference pattern;

calculating a printing error value by using the number of dots corresponding to the printing errors detected in the detecting step and obtaining a correcting value by adding and subtracting the value of the errors to and from a space between adjacent bands;

storing the correcting value obtained in the calculating step; and controlling the space between adjacent bands according to the correcting value, wherein the rotational velocity of the line feeding motor is controlled according to the correcting value in the calculating step.

2. A method for correcting printing errors in a shuttle type multifunctional apparatus as claimed in claim 1, the calculation being performed in the calculating step by adding and subtracting the error value to and from a distance at which the electric line feeding motor moves.

3. A method for correcting printing errors in a shuttle type multifunctional apparatus as claimed in claim 1, the reference pattern including first and second patterns having a predetermined length in a vertical direction, the first and second patterns being set to be eccentric to each other.

4. A method for correcting printing errors in a shuttle type multifunctional apparatus as claimed in claim 3, the numbers of dots being detected in the detecting step being in correspondence with a distance between a lower end of the first pattern and an upper end of the second pattern of the scanned pattern.

5. A method for correcting printing errors in a shuttle type multifunctional apparatus as claimed in claim 4, the distance being calculated by using a first number of dots having black data detected due to the second pattern until scanning the lower end of the first pattern and a second number of dots having white data detected until scanning the lower end of the first pattern to the upper end of the second pattern.

6. A method for correcting printing errors in a shuttle type multifunctional apparatus as claimed in claim 5, upon the first number of dots being detected in the calculating step, the correcting value is calculated by using a formula as follows:

(number of nozzles per a printing block/a resolution of a printer head)+(number of dots in printing errors/a resolution of a shuttle type scanning head)inch.

7. A method for correcting printing errors in a shuttle type multifunctional apparatus as claimed in claim 5, upon the second number of dots being detected in the calculating step, the correcting value is calculated by using a formula as follows:

(number of nozzles per a printing block/a resolution of a printer head)−(number of dots in printing errors/a resolution of a shuttle type scanning head)inch.

8. A device for correcting printing errors in a shuttle type multifunctional apparatus which includes a scanning module reciprocating along a horizontal shaft and a line feeding motor capable of moving documents a predetermined distance, the device comprising:

means for printing a preset reference pattern upon a correcting mode for correcting printing errors having been set;

means for detecting a number of dots corresponding to the printing errors by comparing a scanned pattern with the reference pattern after scanning the printed reference pattern;

means for calculating a printing error value by using the number of dots corresponding to the printing errors detected in the detecting step and obtaining a correcting value by adding and subtracting the value of the errors to and from a space between adjacent bands, means storing the correcting value obtained by the means for calculating;

means for controlling the space between adjacent bands according to the correcting value; and means for controlling the rotational velocity of the line feeding motor according to the correcting value.

9. A device for correcting printing errors in a shuttle type multifunctional apparatus as claimed in claim 8, the calculation being performed by the calculating means by adding and subtracting the error value to and from a distance at which the line feeding motor moves.

10. A device for correcting printing errors in a shuttle type multifunctional apparatus as claimed in claim 8, the reference pattern including first and second patterns having a predetermined length in a vertical direction, the first and second patterns being set to be eccentric to each other.

11. A device for correcting printing errors in a shuttle type multifunctional apparatus as claimed in claim 10, the numbers of dots being detected by the detecting means being in correspondence with a distance between a lower end of the first pattern and an upper end of the second pattern of the scanned pattern.

12. A device for correcting printing errors in a shuttle type multifunctional apparatus as claimed in claim 11, the distance being calculated by the means for calculating by using a first number of dots having black data detected due to the second pattern until scanning the lower end of the first pattern and a second number of dots having white data detected until scanning the lower end of the first pattern to the upper end of the second pattern.

13. A device for correcting printing errors in a shuttle type multifunctional apparatus as claimed in claim 12, upon the first number of dots being detected by the means for calculating, the correcting value is calculated by using a formula as follows:

(number of nozzles per a printing block/a resolution of a printer head)+(number of dots in printing errors/a resolution of a shuttle type scanning head)inch.

14. A device for correcting printing errors in a shuttle type multifunctional apparatus as claimed in claim 12, upon the second number of dots being detected by the means for calculating, the correcting value is calculated by using a formula as follows:

(number of nozzles per a printing block/a resolution of a printer head)−(number of dots in printing errors/a resolution of a shuttle type scanning head)inch.

15. A device for correcting printing errors in a shuttle type multifunctional apparatus, said device having a single print head, said device correcting a speed of a line feed motor so that said print head can print a plurality of lines of print on a sheet of recording medium that are each properly spaced from one another, said device comprising:

a memory having stored within a preset reference pattern comprised of a first pattern and a second pattern;

said single print head printing both said first pattern and said second pattern to form a printed reference pattern on a sheet of recording medium during a correction mode, said first reference pattern being printed before a line feed operation driven by said line feed motor and said second reference pattern being printed after a line feed operation driven by said line feed motor;

a scanner detecting a distance corresponding to a line feed error between a lower end of said first pattern and an upper end of said second pattern of said printed reference pattern; and a CPU calculating said line feed error by using said distance corresponding to said line feed error detected by said scanner and obtaining a correcting value based on whether or not adjacent lines of print overlap each other or are spaced apart from each other and said distance detected by said scanner, said correcting value being used to correct said speed of said line feed motor so that each of said plurality of lines of print on said sheet of recording medium are properly spaced from one another.

16. The device of claim 15, the preset reference pattern comprising first and second patterns having a predetermined length in a vertical direction, the first and second patterns being set to be eccentric to each other.

17. A device of claim 16, the distance being calculated by using a first number of dots having black data caused by print overlap between said first pattern and said second pattern detected due to the presence of said second pattern while scanning the lower end of the first pattern and a second number of dots having white data caused because adjacent lines of print are spaced-apart from each other, said white data being detected between scanning the lower end of the first pattern to the upper end of the second pattern.

18. The device of claim 17, the correcting value for the case when two adjacent lines of print overlap is:

(number of nozzles per a printing block/a resolution of a printer head)+(number of dots in printing errors/a resolution of a shuttle type scanning head)inch.

19. The device of claim 17, the correcting value for the case when two adjacent lines of print are spaced-apart is:

(number of nozzles per a printing block/a resolution of a printer head)−(number of dots in printing errors/a resolution of a shuttle type scanning head)inch.

20. A method for correcting a speed of a line feed motor in a shuttle type multifunctional apparatus having a single print head, said method comprising the steps of:

retrieving from a memory a preset reference pattern comprising a first pattern and a second pattern;

printing, using said single print head, said first reference pattern on a sheet of recording medium;

performing a line feed operation using said line feed motor;

printing, using said single printhead, said second reference pattern on said sheet of recording medium, said second reference pattern being eccentric from said first reference pattern, resulting in a printed reference pattern being printed on said sheet of recording medium;

scanning, using a scanner, said printed reference pattern to determine whether or not said first reference pattern overlaps said second reference pattern and by how much distance or whether said first reference pattern is spaced-apart from said second reference pattern and by how much distance; and calculating a line feed error caused by said line feed motor based on measurements from said scanning step.

21. The method of claim 20, wherein said distance of overlap is determined by the number of times the scanner scans across said sheet of recording medium and detects both said first reference pattern and said second reference pattern.

22. The method of claim 20, wherein said distance of being spaced-apart is determined by the number of times the scanner scans across said sheet of recording medium and detects neither said first reference pattern nor said second reference pattern after said scanner has completed scanning said first reference pattern.

23. The method of claim 20, further comprising the step of correcting the speed of said line feed motor so that said scanner begins detecting said second reference pattern immediately after said scanner finishes detecting said first reference pattern of said printed reference pattern.

24. The method of claim 23, the distance for the case when said two reference patterns overlap is:

(number of nozzles per a printing block/a resolution of a printer head)+(number of dots in printing errors/a resolution of a shuttle type scanning head)inch.

25. The method of claim 23, the distance for the case when two reference patterns are spaced-apart is:

(number of nozzles per a printing block/a resolution of a printer head)−(number of dots in printing errors/a resolution of a shuttle type scanning head)inch.

* * * * *